United States Patent
Parry et al.

(10) Patent No.: US 11,847,014 B2
(45) Date of Patent: *Dec. 19, 2023

(54) AUTOMATED POWER DOWN BASED ON STATE OF FIRMWARE

(71) Applicant: Micron Technology, Inc., Boise, ID (US)

(72) Inventors: Jonathan Scott Parry, Boise, ID (US); Nadav Grosz, Broomfield, CO (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/853,337

(22) Filed: Jun. 29, 2022

(65) Prior Publication Data

US 2022/0327014 A1 Oct. 13, 2022

Related U.S. Application Data

(63) Continuation of application No. 17/036,973, filed on Sep. 29, 2020, now Pat. No. 11,397,631, which is a (Continued)

(51) Int. Cl.
*G06F 11/07* (2006.01)
*G06F 9/445* (2018.01)
(Continued)

(52) U.S. Cl.
CPC ........ *G06F 11/0757* (2013.01); *G06F 1/3225* (2013.01); *G06F 1/3228* (2013.01);
(Continued)

(58) Field of Classification Search
CPC .... G06F 11/0757; G06F 11/076; G06F 9/445; G06F 2201/81; G06F 1/3225; G06F 1/3228; G06F 1/3237; G06F 1/3287
(Continued)

(56) References Cited

U.S. PATENT DOCUMENTS 6,347,276 B1   2/2002 Avery, Jr.
10,795,746 B2  10/2020 Parry et al.
(Continued)

FOREIGN PATENT DOCUMENTS

CN   101320314   12/2008
CN   105159713   12/2015
(Continued)

OTHER PUBLICATIONS

U.S. Appl. No. 16/219,292 U.S. Pat. No. 10,795,746, filed Dec. 13, 2018, Automated Power Down Based on State of Firmware.
(Continued)

*Primary Examiner* — Chae M Ko
(74) *Attorney, Agent, or Firm* — Schwegman Lundberg & Woessner, P.A.

(57) ABSTRACT

Apparatus and methods are disclosed, including determining whether firmware has been successfully loaded and whether the firmware version is valid and operable, and if the firmware has not been successfully loaded or the firmware is not valid and operable, tracking a number of unsuccessful attempts to load the firmware or an elapsed time for unsuccessful attempts to load the firmware, and entering a memory device into a reduced-power state if either the number of unsuccessful attempts or the elapsed time has reached a programmable threshold.

20 Claims, 6 Drawing Sheets

Related U.S. Application Data continuation of application No. 16/219,292, filed on Dec. 13, 2018, now Pat. No. 10,795,746.

(51) Int. Cl.
| | | |
|---|---|---|
| *G06F 1/3287* | (2019.01) | |
| *G06F 1/3225* | (2019.01) | |
| *G06F 1/3228* | (2019.01) | |
| *G06F 1/3237* | (2019.01) | |

(52) U.S. Cl.
CPC .......... *G06F 1/3237* (2013.01); *G06F 1/3287* (2013.01); *G06F 9/445* (2013.01); *G06F 11/076* (2013.01); *G06F 2201/81* (2013.01)

(58) Field of Classification Search
USPC .................................. 714/2, 36, 55; 713/1, 2
See application file for complete search history.

(56) References Cited

U.S. PATENT DOCUMENTS

| | | | |
|---|---|---|---|
| 11,397,631 | B2 | 7/2022 | Parry et al. |
| 2008/0168435 | A1* | 7/2008 | Tupman .................... G06F 8/65 717/173 |
| 2013/0132670 | A1 | 5/2013 | Nishikawa et al. |
| 2015/0277930 | A1* | 10/2015 | Sarangdhar ........... G06F 21/572 713/2 |
| 2016/0055068 | A1 | 2/2016 | Jeansonne et al. |
| 2016/0063255 | A1 | 3/2016 | Jeansonne et al. |
| 2016/0232057 | A1 | 8/2016 | Star et al. |
| 2016/0266838 | A1 | 9/2016 | Jung et al. |
| 2017/0168725 | A1 | 6/2017 | Tamura et al. |
| 2017/0300263 | A1 | 10/2017 | Helmick |
| 2018/0181407 | A1 | 6/2018 | Rothman et al. |
| 2019/0108347 | A1 | 4/2019 | Ghetie et al. |
| 2019/0286436 | A1 | 9/2019 | Liu et al. |
| 2020/0192740 | A1 | 6/2020 | Parry et al. |
| 2021/0011796 | A1 | 1/2021 | Parry et al. |

FOREIGN PATENT DOCUMENTS

| | | |
|---|---|---|
| CN | 113396374 | 9/2021 |
| JP | 2002288150 | 10/2002 |
| JP | 2004509259 | 3/2004 |
| JP | 2004287979 | 10/2004 |
| JP | 2007193596 | 8/2007 |
| JP | 2008090408 | 4/2008 |
| JP | 2008217948 | 9/2008 |
| JP | 2009110034 | 5/2009 |
| JP | 2013142914 | 7/2013 |
| KR | 20160016422 A | 2/2016 |
| WO | 02057904 | 7/2002 |
| WO | WO-2020123059 A1 | 6/2020 |

OTHER PUBLICATIONS

U.S. Appl. No. 17/036,973 U.S. Pat. No. 11,397,631, filed Sep. 29, 2020, Automated Power Down Based on State of Firmware.
"Japanese Application Serial No. 2021-533541, Notification of Reasons for Refusal dated Jun. 21, 2022", w English Translation, 5 pgs.
"Japanese Application Serial No. 2021-533541, Response filed Jul. 26, 2022 to Notification of Reasons for Refusal dated Jun. 21, 2022", w English claims, 11 pgs.
"International Application Serial No. PCT/US2019/059432, International Preliminary Report on Patentability dated Jun. 24, 2021", 7 pgs.
"International Application Serial No. PCT/US2019/059432, International Search Report dated Feb. 27, 2020", 3 pgs.
"International Application Serial No. PCT/US2019/059432, Written Opinion dated Feb. 27, 2020", 5 pgs.
"Japanese Application Serial No. 2022-139599, Notification of Reasons for Refusal dated Sep. 5, 2023", with English translation, 9 pages.
"Korean Application Serial No. 10-2021-7020934, Notice of Preliminary Rejection dated Sep. 22, 2023", with machine English translation, 6 pages.
"CN 2019800894965 Notice of Decision to Grant Received", with machine English translation, 8 pages.

* cited by examiner

AUTOMATED POWER DOWN BASED ON STATE OF FIRMWARE

PRIORITY APPLICATION

This application is a continuation of U.S. application Ser. No. 17/036,973, filed Sep. 29, 2020, which is a continuation of U.S. application Ser. No. 16/219,292, filed Dec. 13, 2018, now issued as U.S. Pat. No. 10,795,746, all of which are incorporated herein by reference in their entirety.

BACKGROUND

Memory devices are semiconductor circuits that provide electronic storage of data for a host system (e.g., a computer or other electronic device). Memory devices may be volatile or non-volatile. Volatile memory requires power to maintain data, and includes devices such as random-access memory (RAM), static random-access memory (SRAM), dynamic random-access memory (DRAM), or synchronous dynamic random-access memory (SDRAM), among others. Non-volatile memory can retain stored data when not powered, and includes devices such as flash memory, read-only memory (ROM), electrically erasable programmable ROM (EEPROM), erasable programmable ROM (EPROM), resistance variable memory, such as phase change random access memory (PCRAM), resistive random-access memory (RRAM), or magnetoresistive random access memory (MRAM), among others.

Host systems typically include a host processor, a first amount of main memory (e.g., often volatile memory, such as DRAM) to support the host processor, and one or more storage systems (e.g., often non-volatile memory, such as flash memory) that provide additional storage to retain data in addition to or separate from the main memory.

A storage system, such as a solid-state drive (SSD), can include a memory controller and one or more memory devices, including a number of dies or logical units (LUNs). In certain examples, each die can include a number of memory arrays and peripheral circuitry thereon, such as die logic or a die processor. The memory controller can include interface circuitry configured to communicate with a host device (e.g., the host processor or interface circuitry) through a communication interface (e.g., a bidirectional parallel or serial communication interface). The memory controller can receive commands or operations from the host system in association with memory operations or instructions, such as read or write operations to transfer data (e.g., user data and associated integrity data, such as error data or address data, etc.) between the memory devices and the host device, erase operations to erase data from the memory devices, perform drive management operations (e.g., data migration, garbage collection, block retirement), etc.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
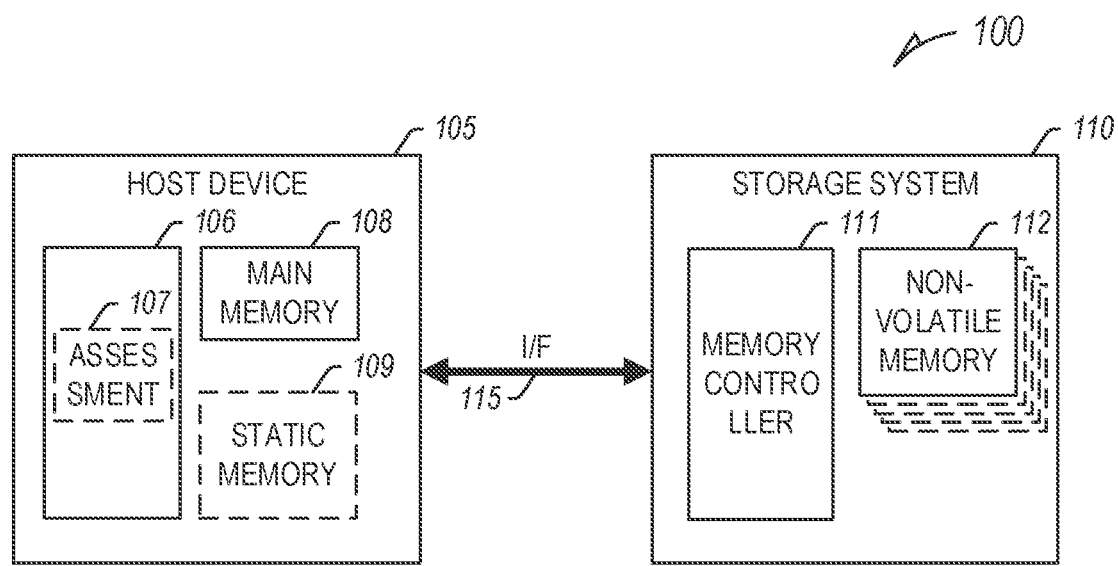
FIG. 1 illustrates an example host system including a host device and a storage system.

Software (e.g., programs), instructions, operating systems (OS), and other data are typically stored on storage systems and accessed by main memory for use by a host processor. Main memory (e.g., RAM) is typically faster, more expensive, and a different type of memory device (e.g., volatile) than a majority of the memory devices of the storage system (e.g., non-volatile, such as an SSD, etc.). In addition to the main memory, host systems can include different levels of volatile memory, such as a group of static memory (e.g., a cache, often SRAM), often faster than the main memory, in certain examples, configured to operate at speeds close to or exceeding the speed of the host processor, but with lower density and higher cost. In other examples, more or less levels or quantities of main memory or static memory can be used, depending on desired host system performance and cost.

Flash memory devices, such as SSD, typically include one or more groups of one-transistor, floating gate memory cells. Two common types of flash memory array architectures include NAND and NOR architectures. The floating gate memory cells of the memory array are typically arranged in a matrix.

For most managed NAND systems (eMMC, UFS, SSD), there is a ROM configured for a limited purpose of loading firmware that is stored elsewhere in the system on non-volatile media such as NOR or NAND. The successful loading of the firmware is a prerequisite for operation of the memory device. Currently, devices with no firmware or corrupted firmware reside in a medium power state and wait indefinitely for the firmware to be loaded using an unlimited number of attempts to successfully load the firmware, even if the firmware is corrupted.

To protect devices with firmware that is not loaded, or firmware that is corrupted, being attacked, or trying to be loaded, the present subject matter provides a ROM-based feature (referred to herein as a firmware activity tracker or firmware activity module) that is implemented to retry a limited number of attempts, timeout, and then shut down clocks and power domains, forcing the system into a protected state with minimal power.

For example, in a manufacturing environment the firmware may not be loaded. For manufacturing steps with massive parallelism, the amount of power that devices can draw is limited. In some examples, the firmware can manage power by throttling, changing frequencies of clocks, gating off power to areas of silicon, or dynamically changing voltages. These protective steps cannot presently be initiated without successfully loading the firmware code. The present subject matter provides similar functionality without firmware, by detecting the inability to successfully load the firmware and then implementing a limited power state.

Typically, a low power state is used for highly accelerated stress testing (HAST) and packaging qualifications. For manufacturing load boards using many units in parallel, such as in a burn oven, the die cannot all draw high power at the same time. For example, if firmware is corrupted or attacked, the present subject matter provides for a protected state or mode for the device in these testing situations.

The present subject matter provides for a ROM code or hardware block to place the memory device in a protected state or mode. A counter, register and/or timer is used to track or count attempts to boot or load firmware, and the state of firmware loading, such as successfully loaded, unsuccessfully loaded, or loaded with corrupt firmware code. The present method further provides a method to detect firmware validity. In the event that the firmware is not successfully loaded, or is loaded in a corrupt or non-functioning state, the present subject matter provides for entering the device into a reduced power state, such as by using voltage control for low dropout (LDO) regulating or power gating. The present subject matter can also, or in the alternative, slow or shut down clocks, clock domains, and oscillators. Benefits of the present subject matter include: automatically lowering power for certain states of firmware to limit power consumption; and internally preventing access to a device for certain states of firmware to protect the device.

Aspects of the present disclosure are directed to a memory system configured to determine whether firmware has been successfully loaded and whether the firmware version is valid and operable, and if the firmware has not been successfully loaded or the firmware is not valid and operable, track a number of unsuccessful attempts to load the firmware or an elapsed time for unsuccessful attempts to load the firmware, and enter a memory device into a reduced-power state if either the number of unsuccessful attempts or the elapsed time has reached a programmable threshold.

FIG. 1 illustrates an example system (e.g., a host system) 100 including a host device 105 and a storage system 110 configured to communicate over a communication interface (I/F) 115 (e.g., a bidirectional parallel or serial communication interface). The host device 105 can include a host processor 106 (e.g., a host central processing unit (CPU) or other processor or processing device) or other host circuitry (e.g., a memory management unit (MMU), interface circuitry, assessment circuitry 107, etc.). In certain examples, the host device 105 can include a main memory 108 (e.g., DRAM, etc.) and optionally, a static memory 109, to support operation of the host processor 106.

The storage system 110 can include a universal flash storage (UFS) device, an embedded MMC (eMMC™) device, or one or more other memory devices. For example, if the storage system 110 includes a UFS device, the communication interface 115 can include a serial bidirectional interface, such as defined in one or more Joint Electron Device Engineering Council (JEDEC) standards (e.g., JEDEC standard D223D (JESD223D), commonly referred to as JEDEC UFS Host Controller Interface (UFSHCI) 3.0, etc.). In another example, if the storage system 110 includes an eMMC device, the communication interface 115 can include a number of parallel bidirectional data lines (e.g., DAT[7:0]) and one or more command lines, such as defined in one or more JEDEC standards (e.g., JEDEC standard D84-B51 (JESD84-A51), commonly referred to as JEDEC eMMC standard 5.1, etc.). In other examples, the storage system 110 can include one or more other memory devices, or the communication interface 115 can include one or more other interfaces, depending on the host device 105 and the storage system 110.

The storage system 110 can include a memory controller 111 and a non-volatile memory 112. In an example, the non-volatile memory can include a number of memory devices (e.g., dies or LUNs), such as one or more flash memory devices, etc., each including periphery circuitry thereon, and controlled by the memory controller 111.

Flash memory devices typically include one or more groups of one-transistor, floating gate memory cells. Two common types of flash memory array architectures include NAND and NOR architectures. The floating gate memory cells of the memory array are typically arranged in a matrix. The gates of each memory cell in a row of the array are coupled to an access line (e.g., a word line). In NOR architecture, the drains of each memory cell in a column of the array are coupled to a data line (e.g., a bit line). In NAND architecture, the drains of each memory cell in a column of the array are coupled together in series, source to drain, between a source line and a bit line.

Each memory cell in a NOR, NAND, 3D Cross Point (Xpoint), Holographic RAM (HRAM), MRAM, or one or more other architecture semiconductor memory array can be programmed individually or collectively to one or a number of programmed states. A single-level cell (SLC) can represent one bit of data per cell in one of two programmed states (e.g., 1 or 0). A multi-level cell (MLC) can represent two or more bits of data per cell in a number of programmed states (e.g., 2n, where n is the number of bits of data). In certain examples, MLC can refer to a memory cell that can store two bits of data in one of 4 programmed states. A triple-level cell (TLC) can represent three bits of data per cell in one of 8 programmed states. A quad-level cell (QLC) can represent four bits of data per cell in one of 16 programmed states. MLC is used herein in its broader context, to refer to any memory cell that can store more than one bit of data per cell (i.e., that can represent more than two programmed states), including TLC and QLC, etc.

The storage system 110 can include a multimedia card (MMC) solid-state storage device (e.g., micro secure digital (SD) cards, etc.). MMC devices include a number of parallel interfaces (e.g., an 8-bit parallel interface) with a host device 105, and are often removable and separate components from the host device. In contrast, embedded MMC (eMMC) devices are attached to a circuit board and considered a component of the host device, with read speeds that rival serial ATA (SATA) based SSD devices. As demand for mobile device performance continues to increase, such as to fully enable virtual or augmented-reality devices, utilize increasing networks speeds, etc., storage systems have shifted from parallel to serial communication interfaces. UFS devices, including controllers and firmware, communicate with a host device using a low-voltage differential signaling (LVDS) serial interface with dedicated read/write paths, further advancing read/write speeds between a host device and a storage system.

In three-dimensional (3D) architecture semiconductor memory device technology, vertical floating gate or charge trapping storage structures can be stacked, increasing the number of tiers, physical pages, and accordingly, the density of memory cells in a memory device.

Data is often stored arbitrarily on the storage system as small units. Even if accessed as a single unit, data can be received in small, random 4-16 k single file reads (e.g., 60%-80% of operations are smaller than 16 k). It is difficult for a user and even kernel applications to indicate that data should be stored as one sequential cohesive unit. File systems are typically designed to optimize space usage, and not sequential retrieval space.

The memory controller 111 can receive instructions from the host device 105, and can communicate with the non-volatile memory 112, such as to transfer data to (e.g., write or erase) or from (e.g., read) one or more of the memory cells of the non-volatile memory array 112. The memory controller 111 can include, among other things, circuitry or firmware, such as a number of components or integrated circuits. For example, the memory controller 111 can include one or more memory control units, circuits, or components configured to control access across the memory array and to provide a translation layer between the host device 105 and the storage system 100.

The non-volatile memory array 112 (e.g., a 3D NAND architecture semiconductor memory array) can include a number of memory cells arranged in, for example, a number of devices, planes, blocks, or physical pages. As one example, a TLC memory device can include 18,592 bytes (B) of data per page, 1536 pages per block, 548 blocks per plane, and 4 planes per device. As another example, an MLC memory device can include 18,592 bytes (B) of data per page, 1024 pages per block, 548 blocks per plane, and 4 planes per device, but with half the required write time and twice the program/erase (P/E) cycles as a corresponding TLC memory device. Other examples can include other numbers or arrangements.

Figure 2A:
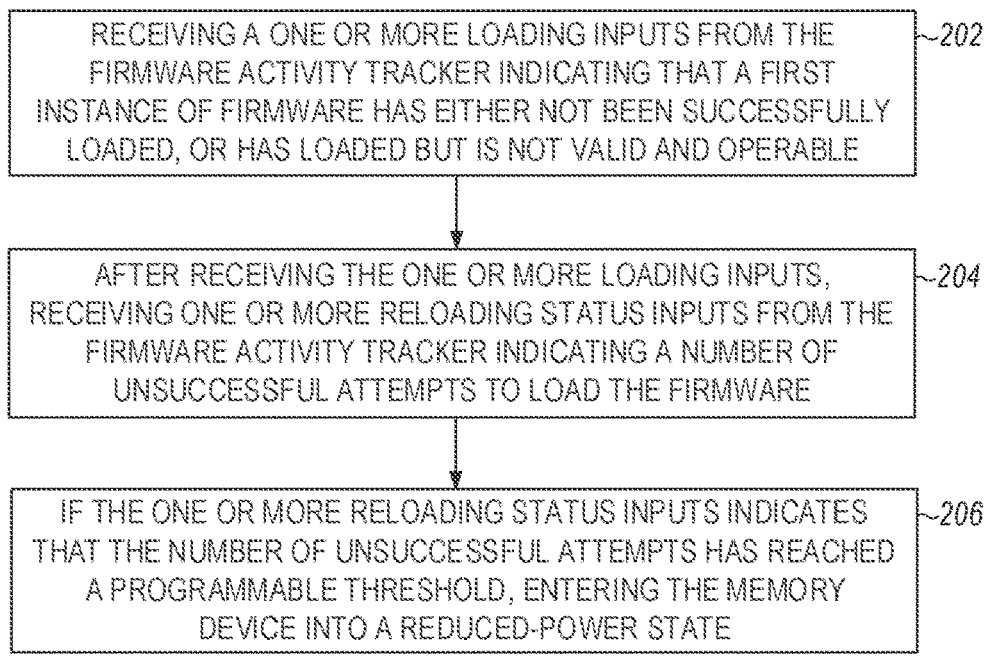
FIGS. 2A-2B illustrate example methods of automated entry of a memory device into a reduced-power state based on a state of firmware.

FIG. 2A illustrates an example method 200 of automated entry of a memory device into a reduced-power state based on a state of firmware. In various examples, the method 200 of operating a memory device includes receiving a one or more loading inputs from the firmware activity tracker indicating that a first instance of firmware has either not been successfully loaded, or has loaded but is not valid and operable, at 202. At 204, after receiving the one or more loading inputs, the method includes receiving one or more reloading status inputs from the firmware activity tracker indicating a number of unsuccessful attempts to load the firmware. If the one or more reloading status inputs indicates that the number of unsuccessful attempts has reached a programmable threshold, the method includes entering the memory device into a reduced-power state, at 206.

Figure 2B:
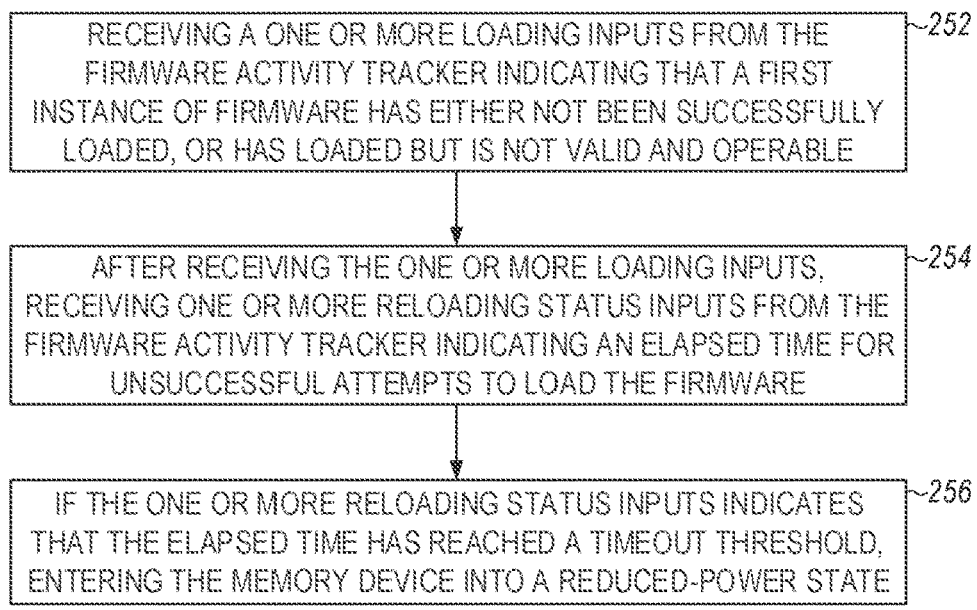

FIG. 2B illustrates an example method 250 of automated entry of a memory device into a reduced-power state based on a state of firmware. In various examples, the method 250 of operating a memory device includes receiving a one or more loading inputs from the firmware activity tracker indicating that a first instance of firmware has either not been successfully loaded, or has loaded but is not valid and operable, at 252. At 254, after receiving the one or more loading inputs, the method includes receiving one or more reloading status inputs from the firmware activity tracker indicating an elapsed time for unsuccessful attempts to load the firmware. If the one or more reloading status inputs indicates that the elapsed time has reached a timeout threshold, the method includes entering the memory device into a reduced-power state, at 256.

In various examples, the firmware activity tracker includes ROM or hardware. For example, thresholds or code to perform any of the included examples can be stored in a fuse, a metal mask, a bonding option, a substrate wiring option, a bootstrap hardware (HW) select pin, or a ROM setting. In one example, pressing a bootstrap button causes a hardwired program to read a bootstrap program from an input unit. The present subject matter refers to programmable operations and programmable thresholds, which can include hardware selected or configured operations and thresholds in various examples. In some examples, programmable code, settings or thresholds refer to settings that are configured through blown fuses, ROM mask changes, wire bonds, substrate connections, configurations pins, or configuration signals. Additional program storage methods can be used without departing from the scope of the present subject matter.

Figure 3:
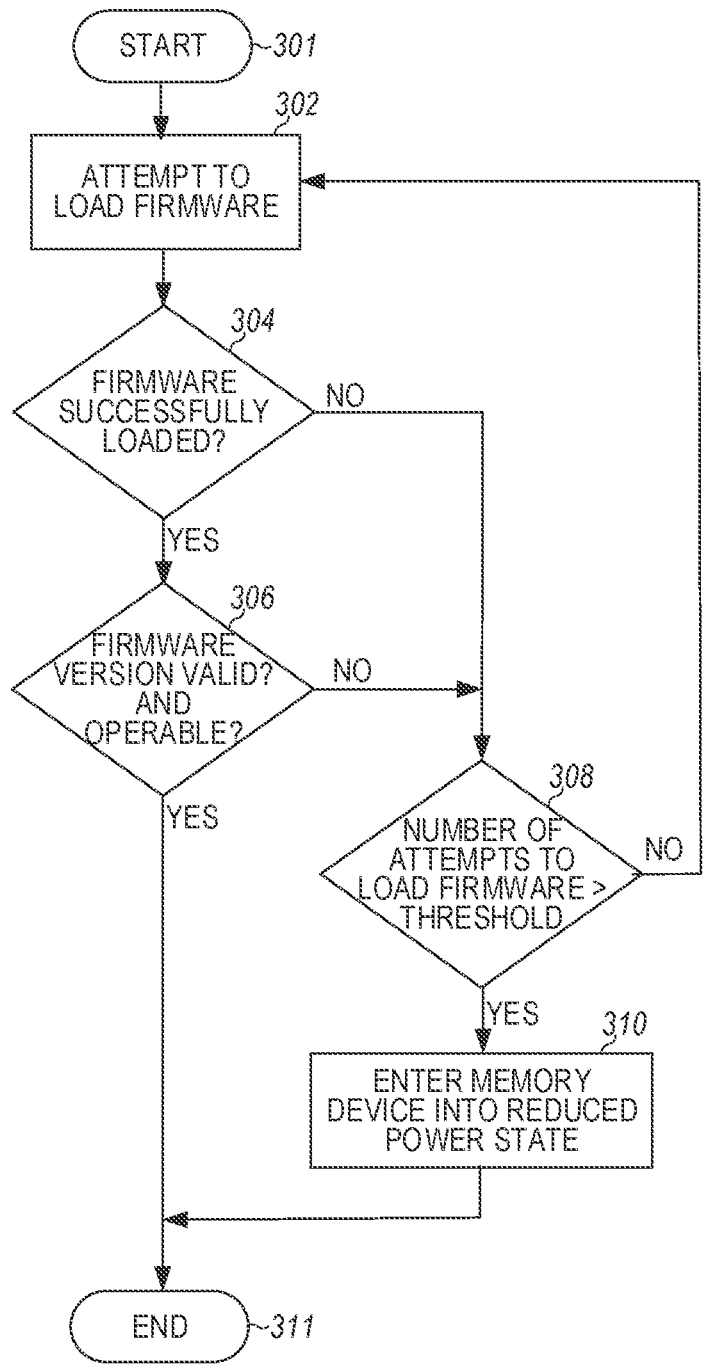
FIG. 3 illustrates an example flow diagram of memory device processing for managed power consumption based on a state of device firmware.

FIG. 3 illustrates an example flow diagram of memory device processing for managed power consumption based on a state of device firmware. The method starts at 301 and attempts to load firmware to the memory device at 302. At 304, the memory controller determines whether the firmware was successfully loaded. If the firmware was successfully loaded, the memory controller determines whether the firmware version is valid and operable at 306. If the firmware version is valid and operable, the method ends at 311. If the firmware was not successfully loaded or the firmware version is not valid and operable, the memory controller checks whether the number of attempts to load the firmware is greater than a threshold. If the number of attempts to load the firmware is not greater than the threshold, the memory controller attempts to load the firmware at 302. If the number of attempts to load the firmware is greater than the threshold, the memory controller enters the memory device into a reduced power state at 310, and the method ends at 311. In various examples, the threshold is programmable. In various examples, a timer for loading the firmware can be used in addition to, or instead of, the attempts threshold. In various examples, the timer is programmable.

Figure 4:
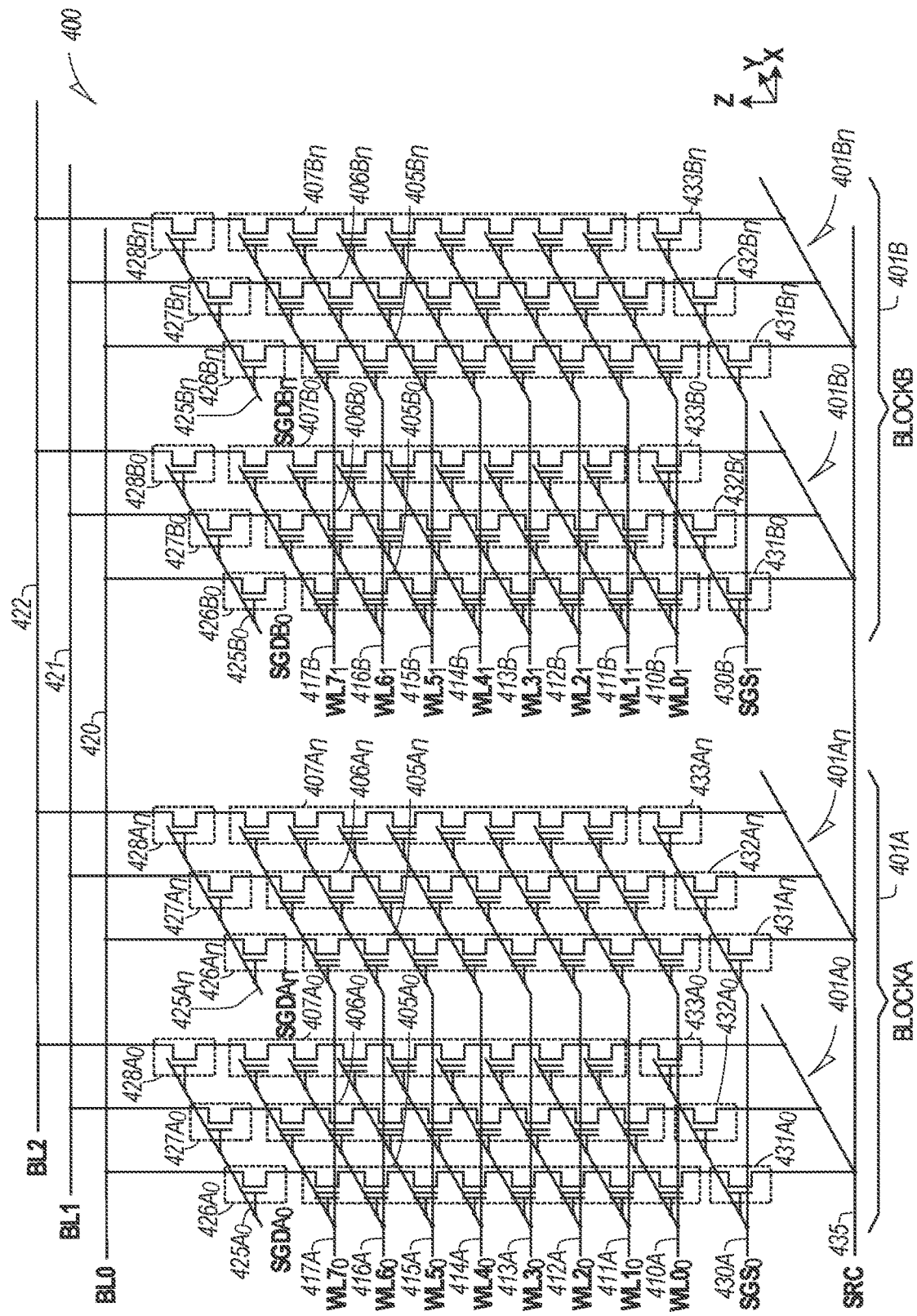
FIG. 4 illustrates an example schematic diagram of a 3D NAND architecture semiconductor memory array.

FIG. 4 illustrates an example schematic diagram of a 3D NAND architecture semiconductor memory array 400 including a number of strings of memory cells (e.g., first-third $A_0$ memory strings $405A_0$-$407A_0$, first-third $A_n$ memory strings $405A_n$-$407A_n$, first-third $B_0$ memory strings $405B_0$-$407B_0$, first-third $B_n$ memory strings $405B_n$-$407B_n$, etc.), organized in blocks (e.g., block A 401A, block B 401B, etc.) and sub-blocks (e.g., sub-block $A_0$ 401$A_0$, sub-block $A_n$ 401$A_n$, sub-block $B_0$ 401$B_0$, sub-block $B_n$ 401$B_n$, etc.). The memory array 400 represents a portion of a greater number of similar structures that would typically be found in a block, device, or other unit of a memory device.

Each string of memory cells includes a number of tiers of charge storage transistors (e.g., floating gate transistors, charge-trapping structures, etc.) stacked in the Z direction, source to drain, between a source line (SRC) 435 or a source-side select gate (SGS) (e.g., first-third $A_0$ SGS $431A_0$-$433A_0$, first-third $A_n$ SGS $431A_n$-$433A_n$, first-third $B_0$ SGS $431B_0$-$433B_0$, first-third $B_n$ SGS $431B_n$-$433B_n$, etc.) and a drain-side select gate (SGD) (e.g., first-third $A_0$ SGD $426A_0$-$428A_0$, first-third $A_n$ SGD $426A_n$-$428A_n$, first-third $B_0$ SGD $426B_0$-$428B_0$, first-third $B_n$ SGD $426B_n$-$428B_n$, etc.). Each string of memory cells in the 3D memory array can be arranged along the X direction as data lines (e.g., bit lines (BL) BL0-BL6 420-422), and along the Y direction as physical pages.

Within a physical page, each tier represents a row of memory cells, and each string of memory cells represents a column. A sub-block can include one or more physical pages. A block can include a number of sub-blocks (or physical pages) (e.g., 128, 256, 384, etc.). Although illustrated herein as having two blocks, each block having two sub-blocks, each sub-block having a single physical page, each physical page having three strings of memory cells, and each string having 8 tiers of memory cells, in other examples, the memory array 400 can include more or fewer blocks, sub-blocks, physical pages, strings of memory cells, memory cells, or tiers. For example, each string of memory cells can include more or fewer tiers (e.g., 16, 32, 64, 128, etc.), as well as one or more additional tiers of semiconductor material above or below the charge storage transistors (e.g., select gates, data lines, etc.), as desired. As an example, a 48 GB TLC NAND memory device can include 18,592 bytes (B) of data per page (16,384+2208 bytes), 1536 pages per block, 548 blocks per plane, and 4 or more planes per device.

Each memory cell in the memory array 400 includes a control gate (CG) coupled to (e.g., electrically or otherwise operatively connected to) an access line (e.g., word lines (WL) $WL0_0$-$WL7_0$ 410A-417A, $WL0_1$-$WL7_1$ 410B-417B, etc.), which collectively couples the control gates (CGs) across a specific tier, or a portion of a tier, as desired. Specific tiers in the 3D memory array, and accordingly, specific memory cells in a string, can be accessed or controlled using respective access lines. Groups of select gates can be accessed using various select lines. For example, first-third $A_0$ SGD $426A_0$-$428A_0$ can be accessed using an $A_0$ SGD line $SGDA_0$ $425A_0$, first-third $A_n$ SGD $426A_n$-$428A_n$ can be accessed using an SGD line $SGDA_n$ $425A_n$, first-third $B_0$ SGD $426B_0$-$428B_0$ can be accessed using an $B_0$ SGD line $SGDB_0$ $425B_0$, and first-third $B_n$ SGD $426B_n$-$428B_n$ can be accessed using an $B_n$ SGD line $SGDB_n$ $425B_n$. First-third $A_0$ SGS $431A_0$-$433A_0$ and first-third $A_n$ SGS $431A_n$-$433A_n$ can be accessed using a gate select line $SGS_0$ 430A, and first-third $B_0$ SGS $431B_0$-$433B_0$ and first-third $B_n$ SGS $431B_n$-$433B_n$ can be accessed using a gate select line $SGS_1$ 430B.

In an example, the memory array 400 can include a number of levels of semiconductor material (e.g., polysilicon, etc.) configured to couple the control gates (CGs) of each memory cell or select gate (or a portion of the CGs or select gates) of a respective tier of the array. Specific strings of memory cells in the array can be accessed, selected, or controlled using a combination of bit lines (BLs) and select gates, etc., and specific memory cells at one or more tiers in the specific strings can be accessed, selected, or controlled using one or more access lines (e.g., word lines).

In a NAND architecture semiconductor memory array, the state of a selected memory cell can be accessed by sensing a current or voltage variation associated with a particular data line containing the selected memory cell. The memory array 400 can be accessed (e.g., by a control circuit, one or more processors, digital logic, etc.) using one or more drivers. In an example, one or more drivers can activate a specific memory cell, or set of memory cells, by driving a particular potential to one or more data lines (e.g., bit lines BL0-BL2), access lines (e.g., word lines WL0-WL7), or select gates, depending on the type of operation desired to be performed on the specific memory cell or set of memory cells.

To program or write data to a memory cell, a programming voltage (Vpgm) (e.g., one or more programming pulses, etc.) can be applied to selected word lines (e.g., $WL4_0$), and thus, to a control gate of each memory cell coupled to the selected word lines. Programming pulses can begin, for example, at or near 15V, and, in certain examples, can increase in magnitude during each programming pulse application. While the program voltage is applied to the selected word lines, a potential, such as a ground potential (e.g., Vss), can be applied to the data lines (e.g., bit lines) and substrates (and thus the channels, between the sources and drains) of the memory cells targeted for programming, resulting in a charge transfer (e.g., direct injection or Fowler-Nordheim (FN) tunneling, etc.) from the channels to the floating gates of the targeted memory cells.

In contrast, a pass voltage (Vpass) can be applied to one or more word lines having memory cells that are not targeted for programming, or an inhibit voltage (e.g., Vcc) can be applied to data lines (e.g., bit lines) having memory cells that are not targeted for programming, for example, to inhibit charge from being transferred from the channels to the floating gates of such non-targeted memory cells. The pass voltage can be variable, depending, for example, on the proximity of the applied pass voltages to a word line targeted for programming. The inhibit voltage can include a supply voltage (Vcc), such as a voltage from an external source or supply (e.g., a battery, an AC-to-DC converter, etc.), relative to a ground potential (e.g., Vss).

As an example, if a programming voltage (e.g., 15V or more) is applied to a specific word line, such as $WL4_0$, a pass voltage of 10V can be applied to one or more other word lines, such as $WL3_0$, $WL5_0$, etc., to inhibit programming of non-targeted memory cells, or to retain the values stored on such memory cells not targeted for programming. As the distance between an applied program voltage and the non-targeted memory cells increases, the pass voltage required to refrain from programming the non-targeted memory cells can decrease. For example, where a programming voltage of 15V is applied to $WL4_0$, a pass voltage of 10V can be applied to $WL3_0$ and $WL5_0$, a pass voltage of 8V can be applied to $WL2_0$ and $WL6_0$, a pass voltage of 7V can be applied to $WL1_0$ and $WL7_0$, etc. In other examples, the pass voltages, or number of word lines, etc., can be higher or lower, or more or less.

Sense amplifiers can be coupled to one or more of the data lines (e.g., first, second, or third bit lines (BL0-BL2) 420-422), can detect the state of each memory cell in respective data lines by sensing a voltage or current on a particular data line.

Between applications of one or more programming pulses (e.g., Vpgm), a verify operation can be performed to determine if a selected memory cell has reached its intended programmed state. If the selected memory cell has reached its intended programmed state, it can be inhibited from further programming. If the selected memory cell has not reached its intended programmed state, additional programming pulses can be applied. If the selected memory cell has not reached its intended programmed state after a particular number of programming pulses (e.g., a maximum number), the selected memory cell, or a string, block, or page associated with such selected memory cell, can be marked as defective.

To erase a memory cell or a group of memory cells (e.g., erasure is typically performed in blocks or sub-blocks), an erasure voltage (Vers) (e.g., typically Vpgm) can be applied to the substrates (and thus the channels, between the sources and drains) of the memory cells targeted for erasure (e.g., using one or more bit lines, select gates, etc.), while the word lines of the targeted memory cells are kept at a potential, such as a ground potential (e.g., Vss), resulting in a charge transfer (e.g., direct injection or Fowler-Nordheim (FN) tunneling, etc.) from the floating gates of the targeted memory cells to the channels.

Figure 5:
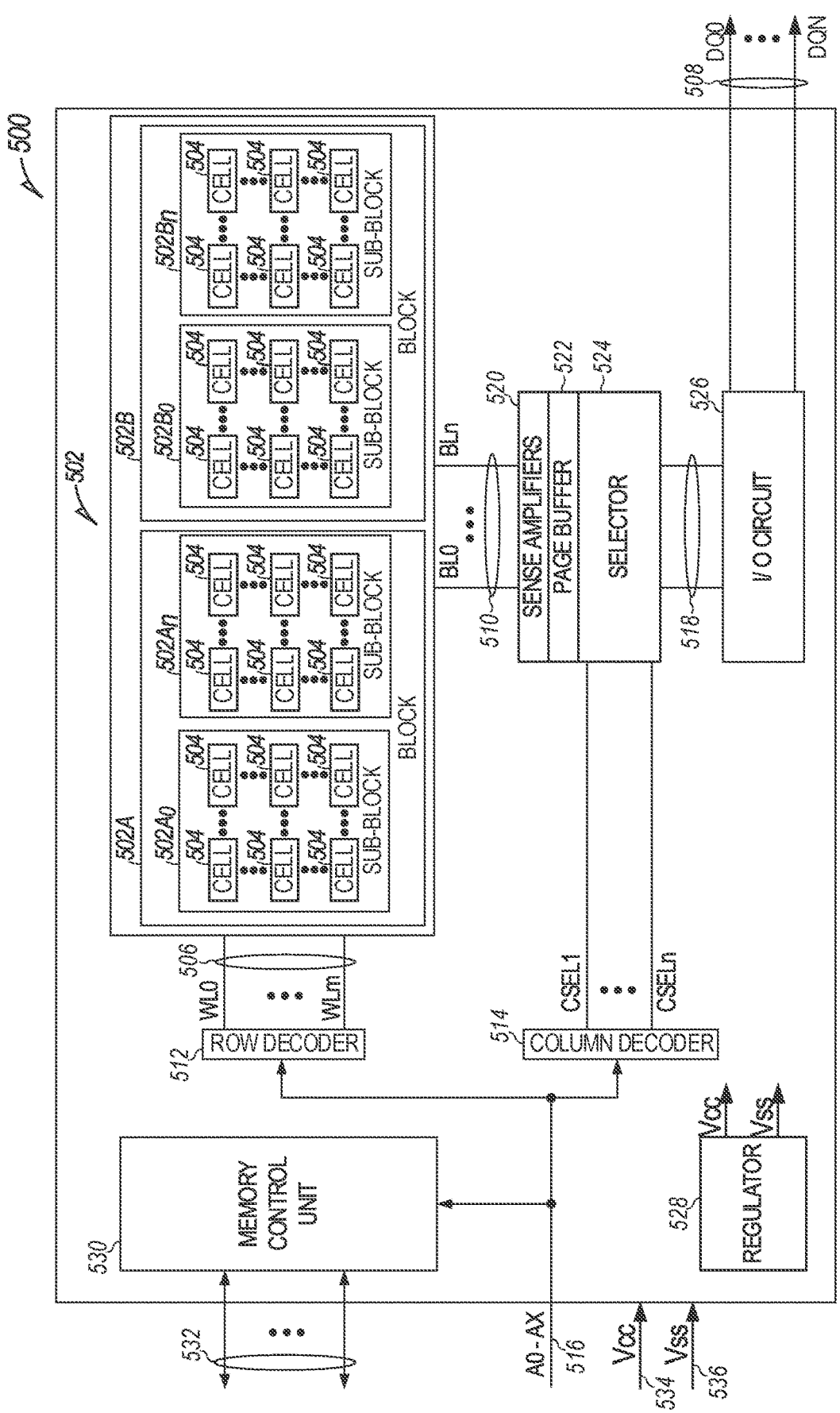
FIG. 5 illustrates an example block diagram of a memory module.

FIG. 5 illustrates an example block diagram of a memory device 500 including a memory array 502 having a plurality of memory cells 504, and one or more circuits or components to provide communication with, or perform one or more memory operations on, the memory array 502. Although shown with a single memory array 502, in other examples, one or more additional memory arrays, dies, or LUNs can be included herein. In certain examples, in a storage system having a number of dies or LUNs, the memory device 500 can represent a block diagram of circuits and components for each die or LUN. The memory device 500 can include a row decoder 512, a column decoder 514, sense amplifiers 520, a page buffer 522, a selector 524, an input/output (I/O) circuit 526, and a memory control unit 530.

The memory cells 504 of the memory array 502 can be arranged in blocks, such as first and second blocks 502A, 502B. Each block can include sub-blocks. For example, the first block 502A can include first and second sub-blocks 502A$_0$, 502A$_n$, and the second block 502B can include first and second sub-blocks 502B$_0$, 502B$_n$. Each sub-block can include a number of physical pages, each page including a number of memory cells 504. Although illustrated herein as having two blocks, each block having two sub-blocks, and each sub-block having a number of memory cells 504, in other examples, the memory array 502 can include more or fewer blocks, sub-blocks, memory cells, etc. In other examples, the memory cells 504 can be arranged in a number of rows, columns, pages, sub-blocks, blocks, etc., and accessed using, for example, access lines 506, first data lines 510, or one or more select gates, source lines, etc.

The memory control unit 530 can control memory operations of the memory device 500 according to one or more signals or instructions received on control lines 532, including, for example, one or more clock signals or control signals that indicate a desired operation (e.g., write, read, erase, etc.), or address signals (A0-AX) received on one or more address lines 516. One or more devices external to the memory device 500 can control the values of the control signals on the control lines 532, or the address signals on the address line 516. Examples of devices external to the memory device 500 can include, but are not limited to, a host, a memory controller, a processor, or one or more circuits or components not illustrated in FIG. 5.

The memory device 500 can use access lines 506 and first data lines 510 to transfer data to (e.g., write or erase) or from (e.g., read) one or more of the memory cells 504. The row decoder 512 and the column decoder 514 can receive and decode the address signals (A0-AX) from the address line 516, can determine which of the memory cells 504 are to be accessed, and can provide signals to one or more of the access lines 506 (e.g., one or more of a plurality of word lines (WL0-WLm)) or the first data lines 510 (e.g., one or more of a plurality of bit lines (BL0-BLn)), such as described above.

The memory device 500 can include sense circuitry, such as the sense amplifiers 520, configured to determine the values of data on (e.g., read), or to determine the values of data to be written to, the memory cells 504 using the first data lines 510. For example, in a selected string of memory cells 504, one or more of the sense amplifiers 520 can read a logic level in the selected memory cell 504 in response to a read current flowing in the memory array 502 through the selected string to the data lines 510.

One or more devices external to the memory device 500 can communicate with the memory device 500 using the I/O lines (DQ0-DQN) 508, address lines 516 (A0-AX), or control lines 532. The input/output (I/O) circuit 526 can transfer values of data in or out of the memory device 500, such as in or out of the page buffer 522 or the memory array 502, using the I/O lines 508, according to, for example, the control lines 532 and address lines 516. The page buffer 522 can store data received from the one or more devices external to the memory device 500 before the data is programmed into relevant portions of the memory array 502, or can store data read from the memory array 502 before the data is transmitted to the one or more devices external to the memory device 500.

The column decoder 514 can receive and decode address signals (A0-AX) into one or more column select signals (CSEL1-CSELn). The selector 524 (e.g., a select circuit) can receive the column select signals (CSEL1-CSELn) and select data in the page buffer 522 representing values of data to be read from or to be programmed into memory cells 504. Selected data can be transferred between the page buffer 522 and the I/O circuit 526 using second data lines 518.

The memory control unit 530 can receive positive and negative supply signals, such as a supply voltage (Vcc) 534 and a negative supply (Vss) 536 (e.g., a ground potential), from an external source or supply (e.g., an internal or external battery, an AC-to-DC converter, etc.). In certain examples, the memory control unit 530 can include a regulator 528 to internally provide positive or negative supply signals.

Figure 6:
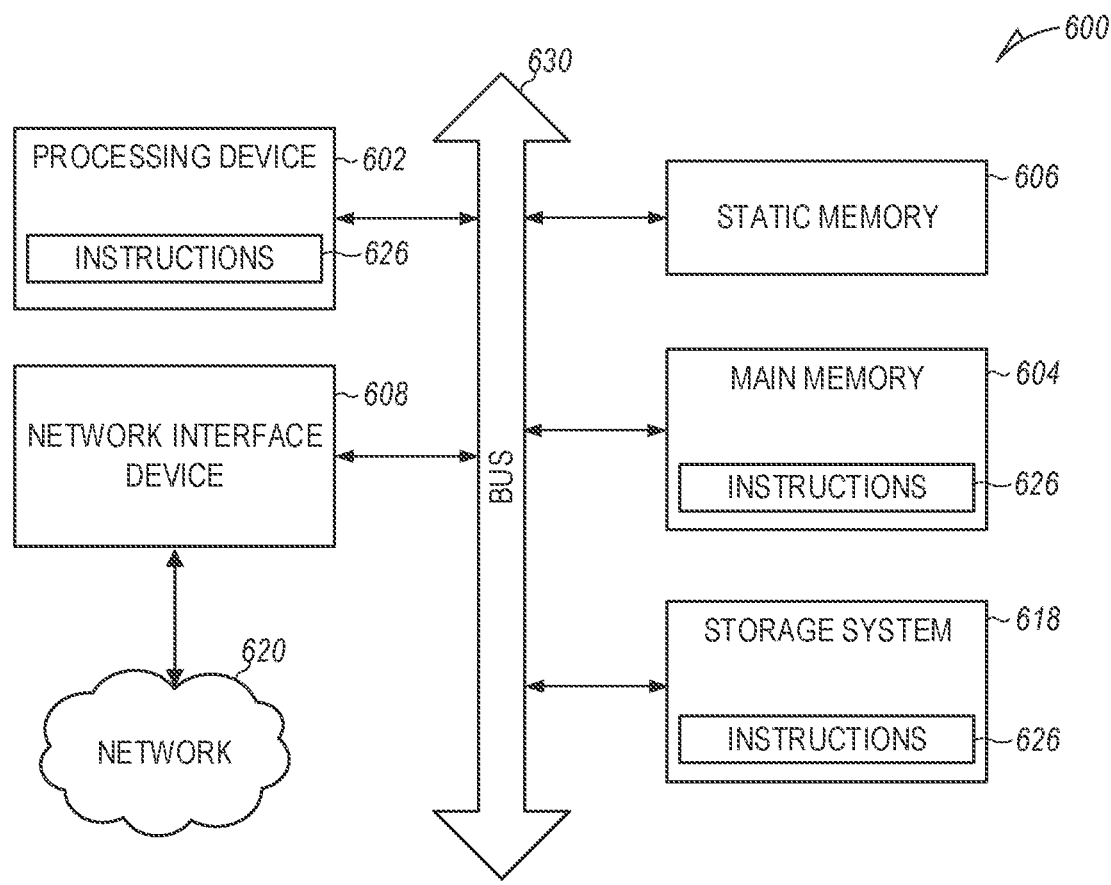
FIG. 6 illustrates an example block diagram of an information handling system.

FIG. 6 illustrates a block diagram of an example machine (e.g., a host system) 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system, a host system, etc.) 600 may include a processing device 602 (e.g., a hardware processor, a central processing unit (CPU), a graphics processing unit (GPU), a hardware processor core, or any combination thereof, etc.), a main memory 604 (e.g., read-only memory (ROM), dynamic random-access memory (DRAM) such as synchronous DRAM (SDRAM) or Rambus DRAM (RDRAM), etc.), a static memory 606 (e.g., static random-access memory (SRAM), etc.), and a storage system 618, some or all of which may communicate with each other via a communication interface (e.g., a bus) 630.

The processing device 602 can represent one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), network processor, or the like. The processing device 602 can be configured to execute instructions 626 for performing the operations and steps discussed herein. The computer system 600 can further include a network interface device 608 to communicate over a network 620.

The storage system 618 can include a machine-readable storage medium (also known as a computer-readable medium) on which is stored one or more sets of instructions 626 or software embodying any one or more of the methodologies or functions described herein. The instructions 626 can also reside, completely or at least partially, within the main memory 604 or within the processing device 602 during execution thereof by the computer system 600, the main memory 604 and the processing device 602 also constituting machine-readable storage media.

The term "machine-readable storage medium" should be taken to include a single medium or multiple media that store the one or more sets of instructions, or any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The machine 600 may further include a display unit, an alphanumeric input device (e.g., a keyboard), and a user interface (UI) navigation device (e.g., a mouse). In an example, one or more of the display unit, the input device, or the UI navigation device may be a touch screen display. The machine a signal generation device (e.g., a speaker), or one or more sensors, such as a global positioning system (GPS) sensor, compass, accelerometer, or one or more other sensor. The machine 600 may include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The instructions 626 (e.g., software, programs, an operating system (OS), etc.) or other data are stored on the storage system 618 can be accessed by the main memory 604 for use by the processing device 602. The main memory 604 (e.g., DRAM) is typically fast, but volatile, and thus a different type of storage than the storage system 618 (e.g., an SSD), which is suitable for long-term storage, including while in an "off" condition. The instructions 626 or data in use by a user or the machine 600 are typically loaded in the main memory 604 for use by the processing device 602. When the main memory 604 is full, virtual space from the storage system 618 can be allocated to supplement the main memory 604; however, because the storage system 618 device is typically slower than the main memory 604, and write speeds are typically at least twice as slow as read speeds, use of virtual memory can greatly reduce user experience due to storage system latency (in contrast to the main memory 604, e.g., DRAM). Further, use of the storage system 618 for virtual memory can greatly reduce the usable lifespan of the storage system 618.

The instructions 624 may further be transmitted or received over a network 620 using a transmission medium via the network interface device 608 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 608 may include one or more physical jacks (e.g., Ethernet, coaxial, or phone jacks) or one or more antennas to connect to the network 620. In an example, the network interface device 608 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

The term "horizontal" as used in this document is defined as a plane parallel to the conventional plane or surface of a substrate, such as that underlying a wafer or die, regardless of the actual orientation of the substrate at any point in time. The term "vertical" refers to a direction perpendicular to the horizontal as defined above. Prepositions, such as "on," "over," and "under" are defined with respect to the conventional plane or surface being on the top or exposed surface of the substrate, regardless of the orientation of the substrate; and while "on" is intended to suggest a direct contact of one structure relative to another structure which it lies "on" (in the absence of an express indication to the contrary); the terms "over" and "under" are expressly intended to identify a relative placement of structures (or layers, features, etc.), which expressly includes—but is not limited to—direct contact between the identified structures unless specifically identified as such. Similarly, the terms "over" and "under" are not limited to horizontal orientations, as a structure may be "over" a referenced structure if it is, at some point in time, an outermost portion of the construction under discussion, even if such structure extends vertically relative to the referenced structure, rather than in a horizontal orientation.

The terms "wafer" and "substrate" are used herein to refer generally to any structure on which integrated circuits are formed, and also to such structures during various stages of integrated circuit fabrication. The following detailed description is, therefore, not to be taken in a limiting sense, and the scope of the various embodiments is defined only by the appended claims, along with the full scope of equivalents to which such claims are entitled.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

As used herein, directional adjectives, such as horizontal, vertical, normal, parallel, perpendicular, etc., can refer to relative orientations, and are not intended to require strict adherence to specific geometric properties, unless otherwise noted. For example, as used herein, a vertical structure need not be strictly perpendicular to a surface of a substrate, but may instead be generally perpendicular to the surface of the substrate, and may form an acute angle with the surface of the substrate (e.g., between 60 and 120 degrees, etc.).

In some embodiments described herein, different doping configurations may be applied to a select gate source (SGS), a control gate (CG), and a select gate drain (SGD), each of which, in this example, may be formed of or at least include polysilicon, with the result such that these tiers (e.g., polysilicon, etc.) may have different etch rates when exposed to an etching solution. For example, in a process of forming a monolithic pillar in a 3D semiconductor device, the SGS and the CG may form recesses, while the SGD may remain less recessed or even not recessed. These doping configurations may thus enable selective etching into the distinct tiers (e.g., SGS, CG, and SGD) in the 3D semiconductor device by using an etching solution (e.g., tetramethylammonium hydroxide (TMCH)).

Operating a memory cell, as used herein, includes reading from, writing to, or erasing the memory cell. The operation of placing a memory cell in an intended state is referred to herein as "programming," and can include both writing to or erasing from the memory cell (i.e., the memory cell may be programmed to an erased state).

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMS), read only memories (ROMs), and the like.

Example 1 is a memory device comprising: a memory array; and a memory controller, wherein the memory controller is programmed to perform operations comprising: receiving one or more loading inputs indicating that a first instance of firmware has either not been successfully loaded, or has loaded but is not valid and operable; after receiving the one or more loading inputs, receiving one or more reloading status inputs indicating a number of unsuccessful attempts to load the firmware; and if the one or more reloading status inputs indicates that the number of unsuccessful attempts has reached a programmable threshold, entering the memory device into a reduced-power state.

In Example 2, the subject matter of Example 1 is optionally configured such that entering the memory device into a reduced-power state includes stopping a clock of the memory device.

In Example 3, the subject matter of Example 1 is optionally configured such that entering the memory device into a reduced-power state includes throttling a clock of the memory device.

In Example 4, the subject matter of Example 1 is optionally configured such that entering the memory device into a reduced-power state includes entering the memory device into a protected state.

In Example 5, the subject matter of Example 1 is optionally configured such that entering the memory device into a reduced-power state includes gating off power to selected power domains of the memory device.

In Example 6, the subject matter of Example 1 is optionally configured such that entering the memory device into a reduced-power state includes using voltage control for the memory device.

In Example 7, the subject matter of any of Examples 1-6 is optionally configured such that the firmware activity tracker includes a portion of a read-only memory (ROM).

In Example 8, the subject matter of any of Examples 1-7 is optionally configured such that the memory device comprises a counter configured to track the number of unsuccessful attempts to load the firmware.

In Example 9, the subject matter of any of Examples 1-8 is optionally configured such that the one or more reloading status inputs indicate an elapsed time for unsuccessful attempts to load the firmware, wherein if the one or more reloading status inputs indicates that the elapsed time has reached a timeout threshold, the memory device is entered into the reduced-power state.

In Example 10, the subject matter of Example 9 is optionally configured such that the memory device comprises a timer configured to track the elapsed time for unsuccessful attempts to load the firmware.

Example 11 is a memory device, comprising: a memory array; and a memory controller, wherein the memory controller is programmed to perform operations comprising: receiving one or more loading inputs indicating that a first instance of firmware has either not been successfully loaded, or has loaded but is not valid and operable; after receiving the one or more loading inputs, receiving one or more reloading status inputs indicating an elapsed time for unsuccessful attempts to load the firmware; and if the one or more reloading status inputs indicates that the elapsed time has reached a timeout threshold, entering the memory device into a reduced-power state.

In Example 12, the subject matter of Example 11 is optionally configured such that entering the memory device into a reduced-power state includes stopping a clock of the memory device.

In Example 13, the subject matter of Example 11 is optionally configured such that entering the memory device into a reduced-power state includes throttling a clock of the memory device.

In Example 14, the subject matter of Example 11 is optionally such that the memory controller is programmed using a bootstrap program.

In Example 15, the subject matter of Example 11 is optionally configured such that the memory device comprises a timer configured to track the elapsed time for unsuccessful attempts to load the firmware.

Example 16 is a device readable storage medium that provides instructions that, when executed by a processor, cause the processor to perform operations comprising: receiving one or more loading inputs indicating that a first instance of firmware has either not been successfully loaded, or has loaded but is not valid and operable; after receiving the one or more loading inputs, receiving one or more reloading status inputs indicating a number of unsuccessful attempts to load the firmware; and if the one or more reloading status inputs indicates that the number of unsuccessful attempts has reached a programmable threshold, entering the memory device into a reduced-power state.

In Example 17, the subject matter of Example 16 is optionally configured such that the firmware activity tracker includes a portion of a read-only memory (ROM).

In Example 18, the subject matter of Example 16 or Example 17 is optionally configured such that the firmware activity tracker comprises a counter configured to track the number of unsuccessful attempts to load the firmware.

In Example 19, the subject matter of any of Examples 16-18 is optionally configured such that entering the memory device into a reduced-power state includes gating off power to selected power domains of the memory device.

In Example 20, the subject matter of Example 19 is optionally configured such that entering the memory device into a reduced-power state includes using voltage control for the memory device.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method of operating a memory device, the method comprising:
   receiving, at a memory controller, one or more loading inputs from a read-only memory (ROM) indicating that a first instance of firmware was unsuccessfully loaded;
   receiving, at the memory controller, reloading status information indicating an elapsed time for loading the firmware;
   determining, by the memory controller, whether the elapsed time meets a timeout threshold; and
   in response to determining that the elapsed time met the timeout threshold, performing, by the memory controller, one or more actions to protect the memory device.

2. The method of claim 1, wherein reloading status information indicates a number of unsuccessful attempts to load the firmware, and wherein the method includes performing the one or more actions in response to the reloading status information indicating that the number of unsuccessful attempts has reached a programmable threshold.

3. The method of claim 1, comprising using a timer to track the elapsed time for unsuccessful attempts to load the firmware.

4. The method of claim 1, wherein performing one or more actions to protect the memory device includes entering the memory device into a reduced-power state.

5. The method of claim 4, wherein entering the memory device into a reduced-power state includes gating off power to selected power domains of the memory device.

6. The method of claim 1, wherein performing one or more actions to protect the memory device includes using voltage control for the memory device.

7. The method of claim 1, wherein performing one or more actions to protect the memory device includes preventing access to the memory device.

8. A memory device, comprising:
   a read-only memory (ROM); and
   a memory controller, wherein the memory controller is programmed to perform operations comprising:
   receiving one or more loading inputs from the ROM indicating that a first instance of firmware was unsuccessfully loaded;
   receiving reloading status information indicating an elapsed time for loading the firmware;
   determining whether the elapsed time meets a timeout threshold; and
   in response to determining that the elapsed time met the timeout threshold, performing one or more actions to protect the memory device.

9. The memory device of claim 8, wherein receiving one or more loading inputs from the ROM indicating that the first instance of firmware was unsuccessfully loaded includes receiving an indication that the loaded instance is inoperable.

10. The memory device of claim 8, wherein receiving one or more loading inputs from the ROM indicating that the first instance of firmware was unsuccessfully loaded includes receiving an indication that the loaded instance is invalid.

11. The memory device of claim 8, wherein the ROM is configured to assist in loading the firmware from a non-volatile medium.

12. The memory device of claim 8, further comprising a timer configured to track elapsed time for unsuccessful attempts to load the firmware.

13. The memory device of claim 8, wherein the memory controller includes interface circuitry configured to communicate with a host device to protect the memory device.

14. A non-transitory computer readable medium comprising instructions thereon that, when executed by a memory controller of a memory device, cause the memory controller to perform operations comprising:
   receiving one or more loading inputs indicating that a first instance of firmware was unsuccessfully loaded;
   receiving reloading status information indicating an elapsed time for loading the firmware;
   determining whether the elapsed time meets a timeout threshold; and
   in response to determining that the elapsed time met the timeout threshold, performing one or more actions to protect the memory device.

15. The non-transitory computer readable medium of claim 14, wherein performing one or more actions to protect the memory device includes entering the memory device into a reduced-power state.

16. The non-transitory computer readable medium of claim 14, wherein performing one or more actions to protect the memory device includes stopping a clock of the memory device.

17. The non-transitory computer readable medium of claim 14, wherein performing one or more actions to protect the memory device includes throttling a clock of the memory device.

18. The non-transitory computer readable medium of claim 14, wherein performing one or more actions to protect the memory device includes entering the memory device into a protected state.

19. The non-transitory computer readable medium of claim 14, wherein performing one or more actions to protect the memory device includes gating off power to selected power domains of the memory device.

20. The non-transitory computer readable medium of claim 14, wherein performing one or more actions to protect the memory device includes using voltage control for the memory device.

* * * * *